United States Patent [19]
Toyoda et al.

[11] Patent Number: 5,266,652
[45] Date of Patent: Nov. 30, 1993

[54] RESINOUS COMPOSITION FOR POWDER COATING

[75] Inventors: Yuji Toyoda, Takatsuki; Akimitsu Uenaka; Hideki Ichimura, both of Suita; Tasaburo Ueno, Sakai; Koichi Tsutsui, Kyoto, all of Japan

[73] Assignee: Nippon Paint Co., Ltd., Osaka, Japan

[21] Appl. No.: 894,757

[22] Filed: Jun. 5, 1992

[30] Foreign Application Priority Data

Jun. 6, 1991 [JP] Japan .................. 3-233670

[51] Int. Cl.$^5$ .............. C08F 20/32; C08L 33/14; C08L 63/08; C08L 63/10
[52] U.S. Cl. .............. 525/327.3; 525/329.7; 525/386; 525/408; 526/266; 526/273; 526/319
[58] Field of Search .................. 525/327.3

[56] References Cited

U.S. PATENT DOCUMENTS 3,876,587  4/1975  Matsui ............... 525/327.3
4,046,727  9/1977  Itoh .................. 523/220

*Primary Examiner*—Joseph L. Schofer
*Assistant Examiner*—Fred Zitomer
*Attorney, Agent, or Firm*—Donald E. Townsend

[57] ABSTRACT

A resinous composition for powder coating, comprising (A) an acrylic resin and (B) a hardener, the acrylic resin being composed of (a) t-butyl methacrylate and/or t-butyl acrylate, (b) an ethylenically unsaturated monomer having a reactive functional group and (c) other ethylenically unsaturated monomer(s) than the said (a) and (b) which is (are) non-reactive with the functional group of (b), the reactive functional group content being 0.0010–0.0046 mol/g of resin, the glass transition temperature being 30–110° C. and the number average molecular weight being 1,000–20,000, and the hardener having in its molecule 2 or more functional groups which are reactive with the reactive functional group possessed by the acrylic resin.

The powder coating based on the present resinous composition is useful for the coating of construction material, auto-mobile and the like and is excellent in low temperature curing properties, storage stability and can result an excellent film even when used a stored powder.

3 Claims, No Drawings

RESINOUS COMPOSITION FOR POWDER COATING

FIELD OF THE INVENTION

The present invention relates to a resinous composition for powder coating comprising an acrylic resin which contains, as constituents, a particular amount of t-butyl methacrylate and/or t-butyl acrylate and reactive functional group bearing ethylenically unsaturated monomer, and a hardener. More particularly, it concerns a resinous composition for powder coating which is specifically useful for the coating of construction materials, automobile parts and the like, is excellent in such properties as blocking resistance, low temperature curability, storage stability, solid-state reaction resistance and the like, and is capable of resulting, even when used with stored material, in a coating having excellent film properties.

BACKGROUND OF THE INVENTION

In coating construction materials, automobile parts and the like, powder coatings have been widely used from the standpoint of operational easiness, environmental pollution and the like. Most of the heretofore proposed powder coatings are based on a resinous composition comprising a base resin having reactive functional group such as polyester resin, epoxy resin and the like, and a hardener, and are cured by baking at a temperature of around 180° C.

However, in order to cut the energy cost involved, it is much preferred to carry out the curing reaction at a lower temperature, and public attentions have been concentrated on studies involving low temperature curable compositions. When glass transition temperature (Tg) of the base resin is an lowered, there is undesired decrease in blocking resistance of the formed powder, and when the number of functional groups in the resin is increased, there is undesired solid-state reaction of the powder during storage, resulting in a coating having a poor appearance.

From the favorable natures of weather resistance, smoothness, gloss and the like, various baking type coating compositions based on the combination of acrylic resin and polyvalent carboxylic acid have been studied. However, in a powder coating area, none of the coating compositions which are satisfiable from the standpoint of low temperature curing, solid-state reaction resistance, blocking resistance, and the like have been found out.

It is, therefore, an object of the invention to provide a resinous composition for powder coating based on an acrylic resin, which is excellent in low temperature curability, blocking resistance and solid-state reaction resistance.

SUMMARY OF THE INVENTION

According to the invention, the abovementioned object can be attained with a resinous composition for powder coating comprising (A) an acrylic resin and (B) a hardener, the acrylic resin being composed of (a) t-butyl methacrylate (TBMA) and/or t-butyl acrylate (TBA), (b) an ethylenically unsaturated monomer having a reactive functional group and (c) other ethylenically unsaturated monomer(s) than the said (a) and (b) which is (are) non-reactive with the reactive functional group possessed by (b), whose reactive functional group content is 0.0010 to 0.0046 mol per gram of resin, glass transition temperature (Tg) is in a range of 30° and 110° C. and number average molecular weight is in a range of 1000 to 20000, and the hardener having in its molecule 2 or more functional groups being reactive with the abovementioned reactive functional group possessed by the acrylic resin.

Preferred embodiments of the invention

In this invention, as a base resin, a particular type of acrylic resin is used. This resin has a number of functional groups reactive with a hardener co-used, at the side chains thereof and is characterized in that a particular amount of t-butyl groups is contained for the purpose of stearic protection of the abovementioned functional groups.

The first element (a) of the present acrylic resin is t-butyl methacrylate and/or t-butyl acrylate, which is used in an amount of 5 to 80 weight % of the total monomers. If the amount of this particular monomer is less than 5% by weight, there is a shortage of the number of t-butyl groups which will afford steric protection for the reactive functional groups in the acrylic resin, resulting in a powder coating which is insufficient in the solid-state reaction resistance. When the amount of this particular monomer exceeds 80% by weight, there is an undesired decrease, in the amount of functional groups reactive with the hardener, resulting in a coating with poor film properties. The amount of t-butyl methacrylate and/or t-butyl acrylate is therefore, preferably selected in a range of 5 and 80% by weight, more preferably 8 to 70% by weight and most preferably 10 to 55% by weight of the total monomers. In practice, the amount of t-butyl methacrylate and/or t-butyl acrylate is determined by taking account of the reactive functional group content. That is, when the reactive functional group content is low, it is only enough to give the desired protection with the least amount of t-butyl group and vice versa. In this sense, it is important to maintain the molar ratio of (a) (TBMA, TBA) / (b) (reactive functional group) per gram of resin in a range of 0.1~3.0.

Even if the amount of TBMA and/or TBA exceeds over the abovementioned ratio, there is no particular change in the solid-state reaction prohibiting activity, but rather a decrease in design freedom of the resin. When the said amount is smaller than the abovementioned ratio, there is undesired decrease in the solid state reaction prohibiting activity.

More preferable, the molar ratio is in a range of 0.15~1.6. As the ethylenically unsaturated monomer (b) having reactive functional groups, various monomers may be used providing the acrylic resin the desired functional groups reactive with the hardener used therewith. The term "reactive functional group" is defined in this invention by the reactivity with the functional group possessed the hardener. In a powder coating area, the following combination of group are commonly used in the combination of base resin and hardener: epoxy group and carboxyl group, epoxy group and amino group, N-methylolamide group and hydroxyl group, oxazoline group and carboxyl group, active hydrogen bearing group and blocked isocyanate group and the like. Therefore, in this invention, one of the defined combination is possessed by a base resin as a reactive functional group, and the other is possessed by a base resin as a reactive functional group, and the other is possessed by the hardener.

Examples of such ethylenically unsaturated monomers (b) having reactive functional groups are compounds having both $\alpha\beta$-ethylenic unsaturation bond and an epoxy group such as glycidyl acrylate and glycidyl methacrylate; a compound having both $\alpha\beta$-ethylenic unsaturation bond and hydroxyl group as hydroxyethyl acrylate, hydroxyethyl methacrylate, hydroxy propyl acrylate and hydroxy propyl methacrylate; a compound having both an $\alpha\beta$-ethylenic unsaturation bond and carboxyl group such as acrylic acid, methacrylic acid and the like; vinyl oxazoline, N-methylol acrylamide and the like.

Among them, particular preference is given to epoxy containing monomers, and especially glycidyl methacrylate, glycidyl acrylate and the like.

The amount of reactive functional groups in the resin is preferably selected in a range of 0.001~0.0046 mol per gram of the resin. If it is less than the said range, it is unable to obtain the desired film strength due to insufficient curing, and if it exceeds the said range, there is an undesired increase in film hardness, resulting a film with less flexibility.

In the present acrylic resin, other ethylenically unsaturated monomer(s) (c) than the abovementioned (a) t-butyl methacrylate and/or t-butyl acrylate and (b) ethylenically unsaturated monomer having reactive functional group and being unreactive with the said functional group of (b) monomer is (are) included as constituting element(s).

Examples of such monomers (c) are acrylates and methacrylates other than t-butyl (meth) acrylate such as methyl acrylate, ethyl acrylate, n-propyl acrylate, isopropyl acrylate, n-butyl acrylate, iso-butyl acrylate, cyclohexyl acrylate, 2-ethyl hexyl acrylate, octyl acrylate, 2-ethyl octyl acrylate, dodecyl acrylate, benzyl acrylate, phenyl acrylate and their corresponding methacrylates, dialkyl phosphate alkyl acrylate, dialkyl phosphate alkyl methacrylate and the like; ethylenically unsaturated monomers as diethyl fumarate, dibutyl fumarate, diethyl itaconate, dibutyl itaconate, styrene, vinyl toluene, -methyl styrene, acrylonitrile, methacrylonitrile, acrylamide, methacrylamide, vinyl acetate, vinyl propionate, lauryl vinyl ether and the like. However, the said monoers (c) are not limited to the abovementioned members and any of the ethylenically unsaturated monomers other than (a) and (b) may be satisfactory used providing they are unreactive with the functional group possessed by (b).

In carrying out the polymerization of these monomers, any of the conventional methods may be satisfactorily used. If desired, the formed resin may be subjected to post-treatment with phosphoric acid, amine or the like.

The present acrylic resin, however, should have a glass transition temperature (Tg) of 30~110° C. This is because, if its Tg is less than 30° C., blocking resistance of the resulting powder coating is unsatisfactory, and if it exceeds 110° C., flowability of the powder coating in the film-forming step is unsatisfactory. Both are not desired.

The present acrylic resin also should have a number average molecular weight of 1000 to 20000, preferably 2000 to 10000. If the molecular weight is too small, the film strength is too low and if the molecular weight is too large, the coating does not have a good appearance due to insufficient flowability.

In this invention, the abovementioned acrylic resin having reactive functional groups is compounded with a hardener. This hardener is a compound having in its molecule, 2 or more functional groups which are reactive with the reactive functional groups of the acrylic resin. The functional groups possessed by the hardener are appropriately selected according to the type of functional groups of the acrylic resin. Examples of hardener which can be used are polyvalent carboxylic acids, polyamines, polyhydric alcohols, blocked isocyanates and the like. In practice, the most preferable resinous composition comprises an epoxy containing acrylic resin and a polyvalent carboxylic acid hardener.

Examples of such polyvalent carboxylic acids are dicarboxylic acids such as glutaric acid, adipic acid, pimelic acid, suberic acid, azelaic acid, sebacic acid, 1,12-dodecane dicarboxylic acid, 1,20-eicosane dicarboxylic acid, citric acid, maleic acid, citraconic acid, itaconic acid, glutaric acid, phthalic acid, isophthalic acid, hexahydrophthalic acid and the like; and polyvalent carboxylic acids such as trimellitic acid and the like. As already stated, in the case of using such a polyvalent carboxylic acid as a hardener, the acrylic resin may preferably have an epoxy group as reactive functional group.

At that time, the equivalent ratio of the carboxyl groups in the polycarboxylic acid to epoxy groups in the acrylic resin is appropriately selected in a range of 0.5~2.0.

In preparing powder coating with the present resinous composition, one may use the following additives as required: pigments such as titanium dioxide, red oxide, yellow iron oxide, carbon black, phthalocyanine blue, phthalocyanine green, quinacridone red pigment and the like; and surface conditioner (as polysiloxane, acrylic resin), plasticizer, UV absorber, antioxidant, antifoaming agent, pigment dispersant, and catalyst (as amine compound, imidazole compound, cationic polymerization initiator and the like). Furthermore, other resins such as acrylic resin, epoxy resin and the like may be used. The present powder coating may be blended with other organic resin microparticles if desired.

In the actual preparation of a powder coating, the required materials are pre-mixed, melt-mixed, pulverized and sieved in a conventional way. Of course, one may use a spray-drying method by using the molten mixture.

Thus obtained powder coatings may be applied on a substrate by using any of the conventional methods such as electrostatic spray coating, fluidized bed coating and the like.

As the coating substrate, mention is made of iron plate, zinc-phosphated steel plate, aluminum plate and the like.

The inventors, having studied the protection means of solidstate reaction of powder coating from the standpoint that the desired effect might be obtained by preventing the direct contact of reactive functional groups of the base resin with the hardener by the bulky side chains of the said resin, the inventors have found that introduction of t-butyl bearing side chains in the base resin is very effective for the abovesaid object.

The inventors have also found that since t-butyl (meth) acrylate has the optimum Tg for powder coating, employment of this particular monomer is very useful for the purpose of improving solid-state reaction resistance without decreasing blocking resistance of the powder coating and the appearance of the coating. The invention shall be now more fully explained in the following Examples. Unless otherwise being stated, all parts and percent are by weight.

Synthetic Example 1

63 parts of xylene were placed in a reactor and heated to 130° C.

To this, a monomer mixture of 45 parts of glycidyl methacrylate, 28.3 parts of t-butyl methacrylate, 20 parts of styrene and 6.7 parts of methyl methacrylate and 5.7 parts of t-butyl peroctoate were dropwise added separately over 3 hours under a nitrogen atmosphere. After maintaining the same temperature for 30 minutes, 1.0 part of t-butyl peroctoate was again dropwise added over 30 minutes and the temperature was maintained at 130° C. for 1 hour. Thereafter, the solvent was removed off under vacuum at 130° C. to obtain an acrylic resin I. The Tg of this resin was 61° C. and number average molecular weight was 4,000.

Synthetic Examples 2 to 8

Following the same processes as stated in Synthetic Example 1 and using the materials shown in Tables 1 and 2, acrylic resins 2 to 8 were prepared. However, in the case of the resin 5, dibutyl phosphate was dropwise added at 80° C. to the post-reaction mixture and maintained at the same temperature for 90 minutes. Thereafter, the solvent was removed. Thus, the resin 5 was phosphor modified. The Tg and number average molecular weight of the respective resins are shown in Table 1 and 2.

TABLE 1(1)

| Syn. Example | Resin composition | | | |
|---|---|---|---|---|
| | 1 | 2 | 3 | 4 |
| monomer ratio * | 0.63 | 0.63 | 0.98 | 0.64 |
| Resin No. | 1 | 2 | 3 | 5 |
| number average molecular weight | 4000 | 4000 | 4000 | 4000 |
| Tg | 61 | 53 | 62 | 55 |
| (1) xylene | 63 | 63 | 63 | 63 |
| (2) glycidyl methacrylate | 45 | 55 | 45 | 45 |
| t-butyl anethacrylate | 28.3 | 28.3 | 44 | 21 |
| t-butyl acrylate | — | — | — | 7 |
| styrene | 20 | 15 | 11 | 20 |
| methyl methacrylate | 6.7 | 1.7 | 0 | 7 |
| ethyl hexyl methacrylat | 0 | 0 | 0 | 0 |
| (3) t-butyl peroctoate | 5.7 | 5.7 | 5.7 | 5.7 |
| (4) t-butyl peroctoate | 1.0 | 1.0 | 1.0 | 1.0 |
| (5) dibutyl phosphate | — | — | — | — |

* ratio of [t-butyl methacrylate + t-butyl acrylate]/[glycidyl methacrylate]

TABLE 1(2)

| Syn. Example | Resin composition | | | |
|---|---|---|---|---|
| | 5 | 6 | 7 | 8 |
| monomer ratio * | 0.63 | 0.02 | 0.63 | 0.44 |
| Resin No. | 6 | 7 | 8 | 9 |
| number average molecular weight | 4000 | 4000 | 25000 | 4000 |
| Tg | 61 | 61 | 61 | 25 |
| (1) xylene | 63 | 63 | 63 | 63 |
| (2) glycidyl methacrylate | 45 | 45 | 45 | 45 |
| t-butyl anethacrylate | 28.3 | 1 | 28.3 | 20 |
| t-butyl acrylate | — | — | — | — |
| styrene | 20 | 19 | 20 | 3.3 |
| methyl methacrylate | 6.7 | 35 | 6.7 | 0 |
| ethyl hexyl methacrylate | 0 | 0 | 0 | 31.7 |
| (3) t-butyl peroctoate | 5.7 | 5.7 | 0.8 | 5.7 |
| (4) t-butyl peroctoate | 1.0 | 1.0 | 1.0 | 1.0 |
| (5) dibutyl phosphate | 1 | — | — | — |

* ratio of [t-butyl methacrylate + t-butyl acrylate]/[glycidyl methacrylate]

Example 1

After combining 48.2 parts of the acrylic resin 1 obtained in Synthetic Example 1, 12.0 parts of 1,10-decane dicarboxylic acid (DDA), 0.29 part of benzoin, 0.10 part of YF-3919 (polysiloxane surface conditioner, manufactured by Toshiba Silicon) and 2.2 parts of YD-012 (bisphenol A type epoxy resin, manufactured by Tohto Kasei), the thus obtained mixture was subjected to melt mixing in Busco Kneader (Bus Co.), Pulverized, and sieved (150 mesh) to obtain a powder coating 1. In the abovementioned resin composition, the functional group ratio of COOH/epoxy was 0.68. Using an electrostatic coating machine (Sames Co.), the thus obtained powder coating was applied on aluminum plate (surface of cast aluminum of 1 cm thickness was previously ground and used) to a film thickness of 60 microns and baked at 150° C. for 10 minutes and then at 140° C. for 20 minutes. Thus prepared coatings were evaluated and film properties of the respective coating are shown in Table 3.

Examples 2 to 8 and Comparative Examples 1 to 4

Following the procedures of Example 1 and using the materials shown in Tables 3 to 5, various powder coatings were prepared. These powder coatings were applied, following the procedures of Example 1, onto similar aluminum plates and zinc phophated steel (0.8 mm thickness), and the performances of the films were evaluated nd shown in Tables 3 to 5. However, in the case of zinc phosphated steel, baking was carried out in a hot furnace maintained at 140° C. for 20 minutes.

TABLE 2(1)

| Example No. | 1 | 2 | 3 | 4 | 5 |
|---|---|---|---|---|---|
| Composition Resin | | | | | |
| 1 | 48.2 | 48.2 | 48.2 | — | — |
| 2 | — | — | — | 48.2 | — |
| 3 | — | — | — | — | 48.2 |
| 4 | — | — | — | — | — |
| 5 | — | — | — | — | — |
| 6 | — | — | — | — | — |
| DDA | 12.0 | 12.0 | 17.6 | 14.7 | 12.0 |
| benzoin | 0.29 | 0.29 | 0.29 | 0.29 | 0.29 |
| YF-3919 | 0.10 | 0.10 | 0.10 | 0.10 | 0.10 |
| YD-012 | 2.2 | 2.2 | 2.2 | 2.2 | 2.2 |
| CR-50 | — | — | — | — | — |

TABLE 2(1)-continued

| Example No. | 1 | 2 | 3 | 4 | 5 |
|---|---|---|---|---|---|
| Ratio of COOH/epoxy | 0.68 | 0.68 | 1.0 | 0.68 | 0.68 |
| Substrate | aluminum | * | aluminum | aluminum | aluminum |
| Performances | | | | | |
| Solvent resistance | ○ | ○ | ○ | ○ | ○ |
| Solid-state reaction resistance | ○ | ○ | ○ | ○ | ○ |
| Initial appearance | ⊙ | ⊙ | ⊙ | ⊙ | ⊙ |
| Blocking resistance | ○ | ○ | ○ | ○ | ○ |

* phosphated steel

TABLE 2(2)

| Example No. | 6 | 7 | 8 |
|---|---|---|---|
| Composition Resin | | | |
| 1 | — | 48.2 | — |
| 2 | — | — | — |
| 3 | — | — | — |
| 4 | — | — | — |
| 5 | 48.2 | — | — |
| 6 | — | — | 48.2 |
| DDA | 12.0 | 12.0 | 12.0 |
| benzoin | 0.29 | 0.29 | 0.29 |
| YF-3919 | 0.10 | 0.10 | 0.10 |
| YD-012 | 2.2 | 2.2 | 2.2 |
| CR-50 | — | 22 | 22 |
| Ratio of COOH/epoxy | 0.68 | 0.68 | 0.68 |
| Substrate | alumnum | * | * |
| Performances | | | |
| Solvent resistance | ○ | ○ | ○ |
| Solid-state reaction resistance | ○ | ○ | ○ |
| Initial appearance | ⊙ | ○∼Δ | ○ |
| Blocking resistance | ○ | ○ | ○ |

* phosphated steel

TABLE 3

| Comp. Example No. | 1 | 2 | 3 | 4 |
|---|---|---|---|---|
| Composition Resin | | | | |
| 1 | — | — | — | 48.2 |
| 7 | 48.2 | — | — | — |
| 8 | — | 48.2 | — | — |
| 9 | — | — | 48.2 | — |
| DDA | 12.0 | 12.0 | 12.0 | 6.2 |
| benzoin | 0.29 | 0.29 | 0.29 | 0.29 |
| YF-3919 | 0.10 | 0.10 | 0.10 | 0.10 |
| YD-012 | 2.2 | 2.2 | 2.2 | 2.2 |
| Ratio of COOH/epoxy | 0.68 | 0.68 | 0.68 | 0.35 |
| Substrate | aluminum | aluminum | aluminum | aluminum |
| Performances | | | | |
| Solvent resistance | ○ | ○ | ○ | X |
| Solid-state reaction resistance | X | ○ | ○ | ○ |
| Initial appearance | ⊙ | X | ⊙ | ⊙ |
| Blocking resistance | ○ | ○ | X | ○ |

Evaluation:
Solvent resistance:
rubbing test with xylene was carried out.
○ . . . good
X . . . not good
Solid-state reaction resistance:
After storing 2 months at 30° C., the stored powder coating was applied on a substrate and baked. The coating appearance was compared with that of unstored powder coating.
○ . . . difference in appearance is very small
X . . . difference in appearance is very large
Initial coating appearance:
Unstored powder coating was applied on a substrate and baked. Coating surface smoothness was visually measured.
○ . . . good
X . . . not good
Blocking resistance:
About 30 ml of test powder coating was placed in a 50 ml sample bottle and maintained at 30° C. for 2 months. Aggregation of the powder was examined.
○ . . . no aggregation
X . . . solidified

What is claimed is:
1. A resinous composition for powder coating comprising (A) an acrylic resin and (B) a hardener, the acrylic resin being composed of (a) 28 to 44% by weight of t-butyl methacrylate (TBMA) and/or t-butyl acrylate (TBS), (b) 45 to 65% by weight of glycidyl methacrylate and/or glycidyl acrylate, (c) 7 to 27% by weight of other ethylenically unsaturated monomer(s) than the said (a) and (b) which is (are) non-reactive with the glycidyl group possessed by (b), having a glass transition temperature (tg) in a range of 30° and 110° C. and number average molecular weight of 1000 and 20000, and the hardener being a poly valent, carboxylic acid having in its molecule 2 or more carboxyl groups.

2. A composition according to claim 1 wherein the ratio of molar amount of (a) / molar amount of (b) per gram of the acrylic resin is 0.1∼3.0.

3. A composition according to claim 1, wherein the reactive functional group of (b) is epoxy group and the hardener is a polyvalent carboxylic acid having in its molecule 2 or more carboxyl groups.

* * * * *